United States Patent
Rajaniemi

[11] Patent Number: 6,042,525
[45] Date of Patent: Mar. 28, 2000

[54] WEB SPREADER ROLL

[75] Inventor: Sauli Rajaniemi, Raahe, Finland

[73] Assignee: Suomen Intech Oy, Parhalahti, Finland

[21] Appl. No.: 09/235,800

[22] Filed: Jan. 22, 1999

[30] Foreign Application Priority Data

Feb. 4, 1998 [FI] Finland ................................. 980251

[51] Int. Cl.⁷ .................................................. B23P 15/00
[52] U.S. Cl. .................................... 492/39; 492/20
[58] Field of Search ........................... 492/39, 16, 38, 492/20, 17, 18, 7; 29/898.07, 898.062

[56] References Cited

U.S. PATENT DOCUMENTS

| | | | |
|---|---|---|---|
| 3,688,370 | 9/1972 | Cahill et al. | 492/16 |
| 3,793,689 | 2/1974 | Specth | 193/37 |
| 3,803,682 | 4/1974 | Stein | 198/791 |
| 3,866,716 | 2/1975 | Matson | 184/14 |
| 4,196,805 | 4/1980 | Banno | 198/827 |
| 4,852,230 | 8/1989 | Yu | 29/898.07 |
| 4,870,731 | 10/1989 | Yano | 492/16 |
| 5,099,559 | 3/1992 | McGrath | 492/16 |
| 5,735,783 | 4/1998 | Joensuu | 492/15 |

FOREIGN PATENT DOCUMENTS 1438879  6/0000  United Kingdom ............... 492/39

*Primary Examiner*—David P. Bryant
*Assistant Examiner*—Marc W. Butler
*Attorney, Agent, or Firm*—Kubovcik & Kubovcik

[57] ABSTRACT

The invention concerns a spreader roll (1) comprising a nonrotating, most advantageously bowed, roll axle (2) and a rotatingly in bearings on said roll axle mounted roll shell (3) that most advantageously is formed by a plurality of tubular roll segments (3a) connected to each other. According to the invention, the roll shell (3) is mounted on the roll axle (2) so that the inner race (5a) of the rolling bearing (5) is arranged to rotate with the roll shell (3).

9 Claims, 2 Drawing Sheets

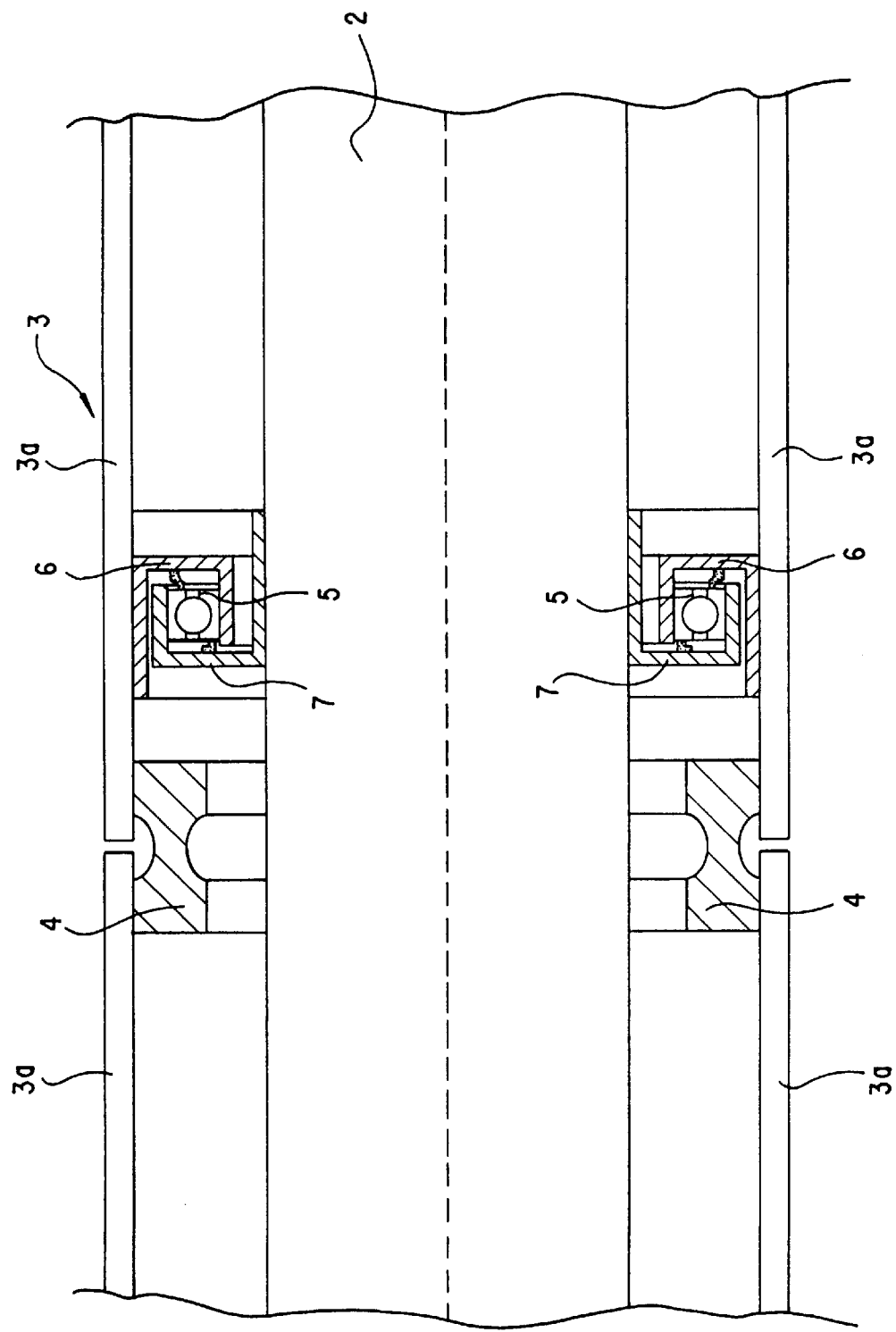

WEB SPREADER ROLL

A spreader roll is conventionally used for lateral spreading of web materials such as paper, textile and film webs. Spreader roll constructions employed in the art comprise a nonrotating axle which most advantageously has a curved shape and onto which is adapted a rotating outer shell that conventionally is formed from a plurality of mutually interconnected segments. The shell segments are mounted on the roll axle using rolling bearings so that the outer race of the bearing rotates with the shell segment. Typically, the spreader roll runs subjected to light loads only. Usually, the web acts so as to reduce the loading of the spreader roll. This often causes an abnormal function of the rolling elements of bearings. For instance, the balls of a ball bearing fail to roll, but rather, the outer race of the bearing tends to slide over the balls. Resultingly, the balls wear out of their shape. Furthermore, the lubrication of the bearing does not function properly due to gravitational forces. These factors cause an increased risk of damage to the bearings.

It is an object of the present invention to provide an entirely novel type of spreader roll capable of overcoming the above-mentioned problems.

The spreader roll according to the invention is based on mounting the shell of the spreader roll on rolling bearings so that the inner race of the bearing rotates with the shell of the roll, while the outer race of the bearing is stationary.

The spreader roll according to the invention offers a number of significant benefits. The present arrangement having the inner race of the bearing running with the shell of the spreader roll or segment thereof forces the rolling elements of the bearing to rotate even under no-load conditions of the roll. Thus, the lubrication of the bearing stays good. Also the risk of damage to the bearing is reduced.

In the following the invention is described in greater detail with the help of an exemplifying embodiment by making reference to the annexed drawings in which FIG. 1 shows a bowed spreader roll;

FIG. 2 shows a portion of the spreader roll in a cross-sectional view; and

Figure 1:
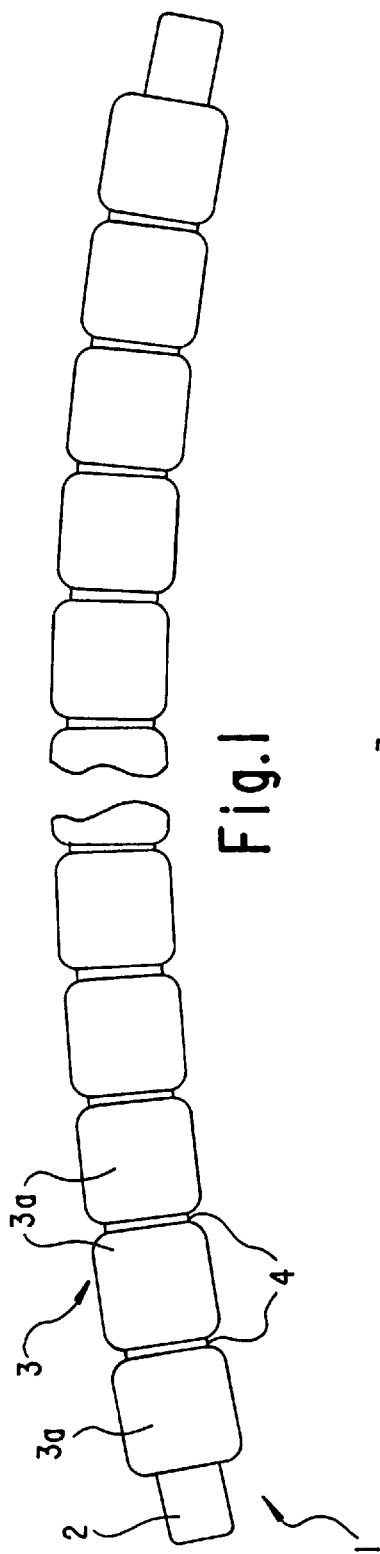
Figure 3:
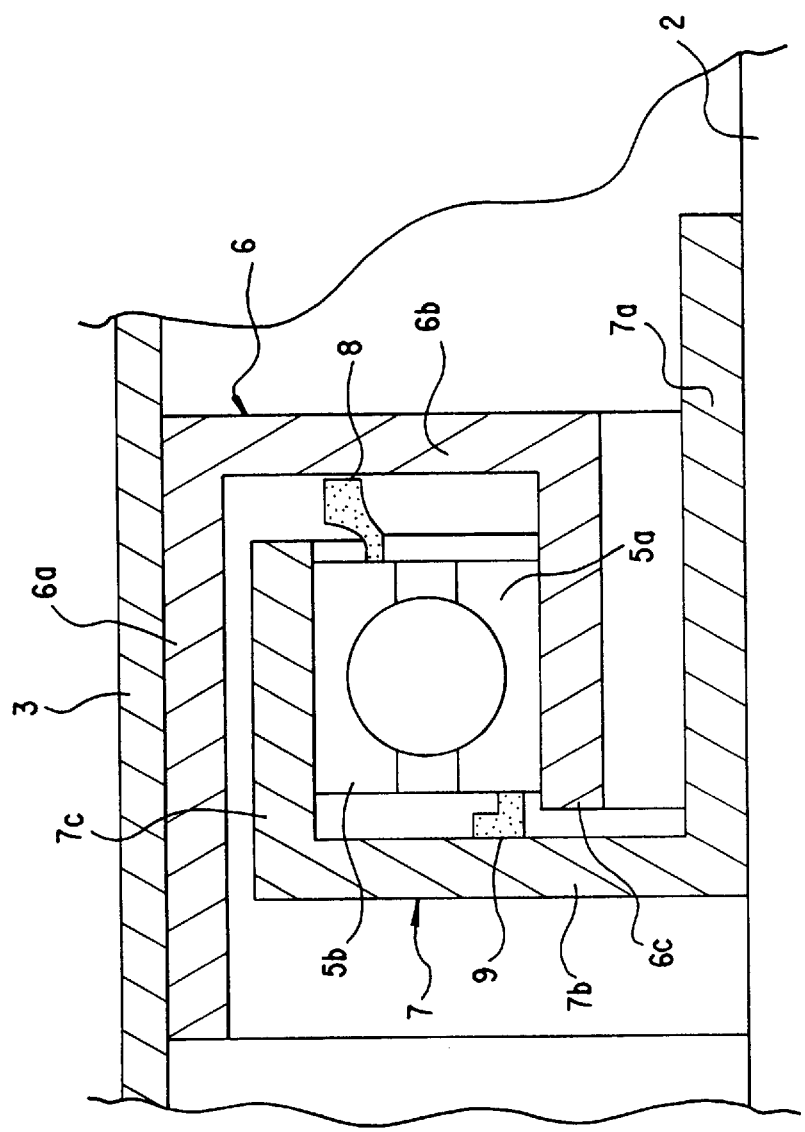
FIG. 3 shows a detail of FIG. 2.

With reference to FIG. 1, therein is shown a spreader roll 1. The spreader roll comprises a roll axle 2, most advantageously having a curved shape, and a roll shell 3 which is adapted to run around the axle and in the illustrated embodiment is comprised of a plurality of tubular roll segments 3a placed about the axle 2. Further, the spreader roll includes bearings 5 (FIGS. 2 and 3) on which the roll shell 3 or roll segments 3a run and which facilitate the rotation of the roll segments 3a around the roll axle 2. In addition to the roll axle 2, the roll segments 3a and the bearings 5, the spreader roll illustrated in the diagram includes elastic coupling elements 4 that serve to keep the opposite ends of each adjacent roll segment 3a parallel to each other and to facilitate axial inclination of the adjacent roll segments 3a relative to each other and transmission of rotating torque from one segment to next adjacent one. In the diagrams, the coupling elements 4 are shown in a simplified form.

The roll shell 3 is mounted on the axle 2 so that the inner race 5a of the rolling bearing 5 rotates with the roll shell 3 and the outer race 5b is supported on the axle 2 thus remaining stationary. The roll itself comprises an outer support element 6 connecting the roll shell 3 to the inner race 5a of the bearing and an inner support element 7 connecting the roll axle 2 to the outer race 5b of the bearing. In the embodiment shown in the diagram, the outer support element 6 comprises a part 6a facing the inner surface of the roll shell 3, next a part 6b extending most advantageously radially inward toward the roll axle and finally a part 6c which forms an extension of the latter so as to be most advantageously parallel to the inner surface of the roll shell and is radially inward outdistanced from said part 6a facing the roll shell 3. The inner support element 7 comprises a part 7a facing the outer surface of the roll axle 2, next a part 7b extending most advantageously radially outward toward the roll shell and finally a part 7c which is essentially parallel to said part 7a facing the roll axle and is radially outward outdistanced toward the roll shell from said part 7a facing the roll axle. In the embodiment shown in the diagram, the support elements 6, 7 are adapted facing each other and partially inserted into each other so that the bearing 5 will be enclosed running between said annular parts 6c and 7c. The support structure further includes appropriate seal means 8, 9. The inner support element 7 is fastened to the roll axle 2 using a suitable locking means such a screw (not shown) or by welding, for instance. The outer support element is fastened to the inner surface of the roll shell, e.g., by welding or using a suitable locking means such a screw.

Typically, the spreader roll 1 is formed by a nonrotating, most advantageously curved, roll axle 2 and a roll shell 3 which is rotatingly mounted on said roll axle and is comprised of a plurality of tubular shell segments connected to each other. The roll axle functions as a support shaft and may itself as well be formed by a plurality of sections. According to the invention, the roll shell 3 is arranged to rotate about the roll axle 2 by mounting the roll shell on bearings so that the inner race 5a of the rolling bearing 5 rotates with the roll shell 3.

The outer race 5b of the rolling bearing is supported by means of an inner support element 7 on the roll axle 2. The inner race 5a of the rolling bearing 5 is supported by means of an outer support element 6 on the roll shell 3. The support elements may be separate components, or alternatively, integral with the bearing or the roll shell and axle.

The bearing 5 is adapted to run between the outer support element 6 and the inner support element 7. Radially, the bearing remains enclosed between the inner part 6c of the outer support element 6 and the outer part 7c of the inner support element 7. The outer support element 6 is closely fit at least with the radially annular inner surface of the inner race 5a of the bearing. Respectively, the inner support element 7 is closely fit at least with the radially annular outer surface of the outer race 5b of the bearing. Typically, the rolling bearing 5 is a roll bearing, but it may as well be any conventional rolling bearing.

According to the invention, the spreader roll comprises a structure in which each roll segment 3a is supported on the roll axle 2 by a single bearing 5, or alternatively, the structure may be implemented using a dual-bearing construction in which each roll segment 3a is supported on the roll axle 2 by two bearings 5.

The arrangement according to the invention is suitable for use in all types of spreader rolls. It can be applied to constructions in which each roll segment is provided with a single bearing as well as in the so-called dual-bearing supported spreader roll constructions having each roll segment principally mounted on two bearings.

To a person versed in the art, it is obvious that the invention is not limited by the above-described embodiments, but rather, can be varied within the scope and spirit of the appended claims.

I claim:

1. Spreader roll (1) comprising a nonrotating roll axle (2); a roll shell (3) rotatingly mounted on said roll axle (2) via a rolling bearing (5) having an outer race (5*b*) and an inner race (5*a*); a first supporting element (7) fastened to said roll axle (2) for supporting the outer race (5*b*) on said roll axle (2) so that the outer race (5*b*) remains nonrotating together with the roll axle (2); and a second supporting element (6) fastened to said roll shell (3) for supporting the inner race (5*a*) on said roll shell (3) so that the inner race (5*a*) rotates with the roll shell.

2. Spreader roll according to claim 1, wherein radially the rolling bearing remains enclosed between an inner part (6*c*) of the outer support element (6) and an outer part (7*c*) of the inner support element (7).

3. Spreader roll according to claim 1, wherein the rolling bearing (5) is a ball bearing.

4. Spreader roll according to claim 1, wherein the outer support element (6) is closely fit at least with a radially annular inner surface of the inner race (5*a*) of the bearing.

5. Spreader roll according to claim 1, wherein the inner support element (7) is closely fit at least with a radially annular outer surface of the outer race (5*b*) of the bearing.

6. Spreader roll according to claim 1, wherein the roll shell (3) comprises a plurality of tubular roll segments (3*a*) that are connected to each other.

7. Spreader roll according to claim 6, wherein each roll shell segment (3*a*) is supported on the roll axle (2) by a single rolling bearing (5).

8. Spreader roll according to claim 6, wherein each roll shell segment (3*a*) is supported on the roll axle (2) by two rolling bearings (5).

9. Spreader roll according to claim 6, wherein the roll axle (2) is bowed.

* * * * *